Patented Dec. 21, 1937

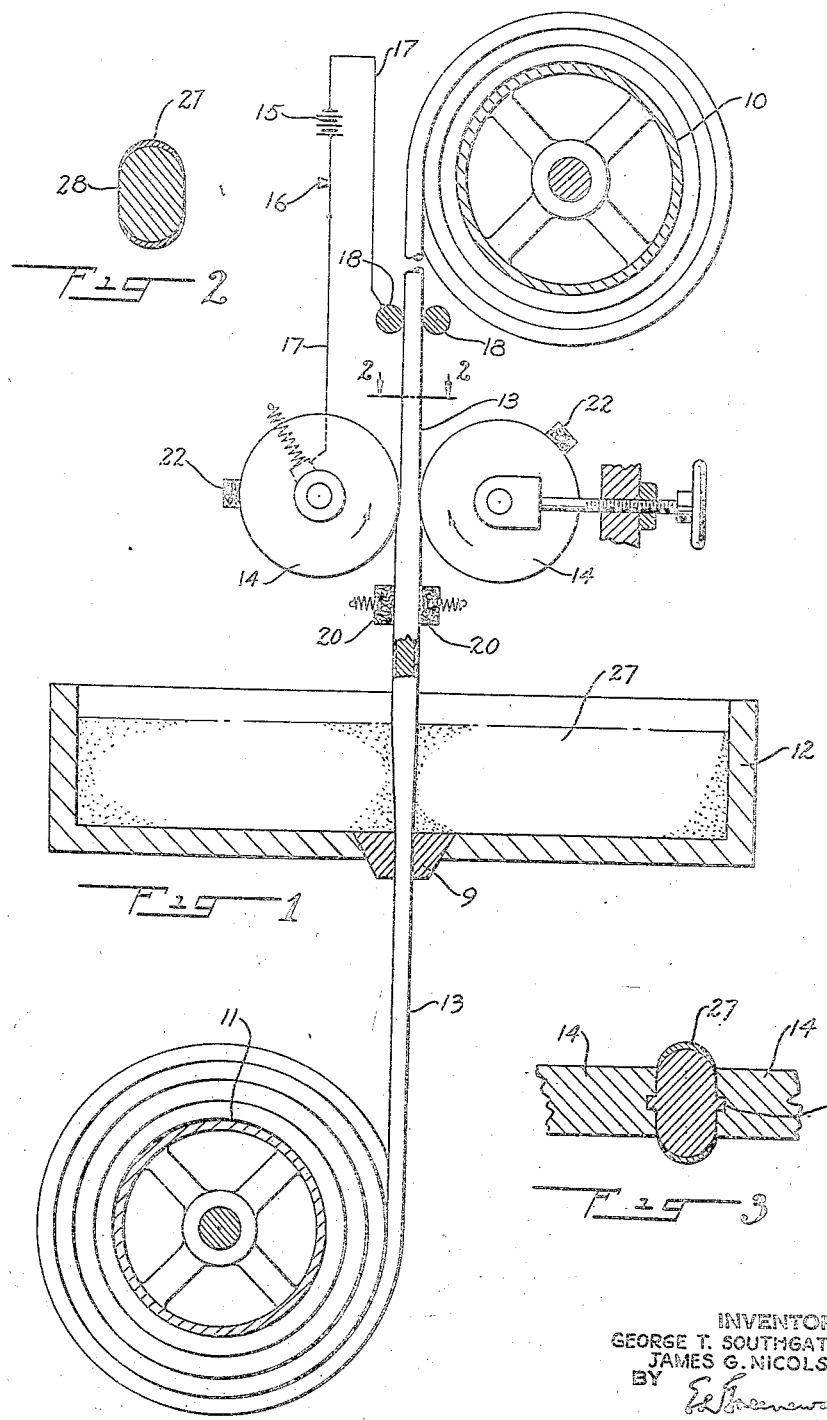

2,102,813

UNITED STATES PATENT OFFICE 2,102,813

WELDING ROD

George T. Southgate, Forest Hills, and James G. Nicolson, Niagara Falls, N. Y., assignors, by mesne assignments, to Union Carbide and Carbon Company, a corporation of New York Original application August 14, 1934, Serial No. 739,748. Divided and this application September 12, 1936, Serial No. 100,418. In Canada August 13, 1935

11 Claims. (Cl. 219—8)

The present invention relates to welding rods or wires, and more particularly to partially coated welding rods or wires to be used as filler metal in fusion welding by the oxy-acetylene, electric arc, or other welding processes. This application is a division of copending application Serial No. 739,748, filed August 14, 1934.

Welding rods or wires have been proposed heretofore which are of substantially elliptical or dumb-bell shape in transverse section. It has also been proposed to apply an oxide or other coating upon circular welding rods, or upon the rounded portion of a partly circular welding rod.

Welding rods such as described or proposed heretofore suffer from the disadvantage that they do not combine the possibility of efficient electrically conductive contact with a current-carrying member, with the possibility of ready visibility to the operator when welding within grooves. Furthermore, these welding rods do not lend themselves to holding the arc effectively or symmetrically (as in electric welding). The control of the welding puddle and the production of perfect or satisfactory welds are rendered more difficult by their use.

An object of this invention is to provide a welding wire shaped in such a manner as to enable an efficient electrically conductive metal-to-metal contact between a portion of the surface of the wire and an electrically conductive member or element of an automatic or other welding machine. Another object of this invention is to provide an improved welding rod having portions which are coated with flux and portions which are bare and cooperate with mechanism to guide such rod to the welding point.

The above and other objects of the invention are accomplished, in accordance with this invention, by providing a welding rod in which two coated and transversely curved longitudinally continuous surface portions are spaced by two bare longitudinally continuous surface portions.

The novel and characteristic features of our invention are set forth with particularity in the appended claims. The invention itself, however, together with additional objects and advantages thereof, may be better understood from the following description of one form of apparatus with which a welding rod embodying the principles of the present invention may be produced.

In the drawing, wherein like reference characters indicate corresponding parts in the different views:

Fig. 1 schematically represents an apparatus for simultaneously coating, shaping and drying any desired type of weld wire;

Fig. 2 represents a cross-section along line 2—2 of the weld wire shown in Fig. 1, and Fig. 3 represents a cross-section of a modified type of weld wire.

The apparatus shown in the drawing comprises upper and lower wire reels 10 and 11 respectively, preferably of metal, and intermediate these reels a dipping trough 12 and a pair of cylindrical flattening rolls 14 driven in any conventional manner. The wire 13 is unwound from the lower reel 11, passed upwardly through the gland or stuffing box 9 of dipping or coating tank 12 and is wound upon the upper reel 10 which is also driven by suitable means, such as a belted connection to the driving means (not shown) provided for the flattening rolls 14. Preferably, there is some degree of slippage between the rate of drive of the rolls and that of the upper reel to compensate for the changing periphery of the coil of wire as it piles up on the reel. A source of electric current is provided at 15 which is connected into a circuit including switch 16, conductors 17, roll 14, wire 13, and contact roller 18. This circuit, when closed by switch 16, causes electric current to flow through the portion of wire 13 which at any given instant is comprised between rolls 14 and contact roller 18, of a magnitude sufficient to complete the drying before each increment of the wire reaches the upper reel 10. The upper or auxiliary rolls 18 may serve not only for the upper conductive connection but also, through suitable mechanism of familiar type, for guiding the wire into a neat lay upon the reel, thus forming a compact coil thereon. The wire may be left on the upper reel 10 for shipment and use, or the reel may be made collapsible and the coil of wire accumulated thereupon removed and prepared for shipment as by wrapping with paper. A pair of soft pads 20 are arranged above the dipping or coating vat 12 and below the flattening rolls 14, one on each side of the wire 13. These pads are adjusted and disposed to wipe off from the lateral peripheral portions of the wire about to be flattened, the coating liquid which would otherwise become deposited upon the rolls. To supplement these lateral wire-wipers there are provided a pair of roll-wipers 22 pressing against the periphery of the two flattening rolls, in order to remove any coating liquid which might escape the wire-wipers in the lateral zones of the flattening.

The operation of the apparatus for the simultaneous localized coating, flattening and drying of weld wire is as follows:

The apparatus is started by starting the rotation of the rolls 14 in the direction shown by the arrows. A wire, such as wire 13, having been previously wound upon reel 11, is partly unwound from the reel, passed through the gland 9 of the coating tank 12 where it is covered with coating material 27; then it is passed through the pads 20, and is brought into engagement first with the flattening rolls 14, and then with the contact rollers 18. At this moment switch 16 is closed, whereby the portion of the wire between rolls 14 and 18 is heated and dried. The wire 13 is then brought into engagement with rotating reel 10 and wound thereupon.

The apparatus described above may be used for coating of welding wire with various types of coating material, including oxides, salts, metal powders, fibrous materials, organic substances, mineral or other powders suspended or dissolved in water, alcohol, ethylene dichloride, carbon tetrachloride, and/or any other sufficiently volatile liquid. The coating bath should preferably be made up as a rather viscous slurry, and may contain in solution or suspension, glue, resins, or other cementitious materials which when dried will impart strong bonding property to the coating. The coating and drying may proceed at any desired rapid rate, such as 60 ft. per minute, for example. The operation of the apparatus may be effected in multiple, i. e. with a number of wires drawn through the same bath and rolls, but taken from or carried to individual supply reels and receiving reels, and provided with electric heating circuits connected in parallel.

The product made in accordance with this invention has certain substantial advantages over welding wire previously made. The elongated shape of the wire lends itself to greater visibility to the operator, especially in welding within deep grooves, and thus assists him in holding the arc (in electric welding), controlling the puddle, and perfecting the quality of the deposit. The bare flat surfaces of the wire are particularly useful for cooperating with guiding and feeding mechanism in propelling the wire to the welding point, and for conductive electric connection in feeding the wire through automatic arc-welding machines. Furthermore, such surfaces are helpful even in manual welding in giving quick connection by clamping with ordinary pliers.

Fig. 2 represents a cross-section of a flattened wire produced by using smooth cylindrical shaping rolls. The coating material is shown at 27 and the flattened contact-providing surfaces at 28. A preferred weld wire of this type is one in which the major axis bears a relation to the minor axis of about 1 to ½.

By using a pair of shaping rolls having a profiled periphery it is possible to obtain a weld wire in which the bare contact-providing surface carries one or two projections or ridges such as shown in Fig. 3. This shape of the contact surface has the advantage of providing guiding contact ridges 31 for accurately aligning the wire when passing it through the welding head of an automatic welding machine. Of even greater importance, these ridges serve as improved means of electric contact as the wire passes through an automatic electric-welding head, in that they may be pressed tightly without injury to the coating, and may be operated at high current density.

We claim:

1. A welding wire comprising two transversely curved longitudinally continuous surface portions separated by two longitudinally continuous portions, said first mentioned surface portions being coated and said last mentioned portions being bare.

2. A welding wire as defined in claim 1 in which the transverse axis perpendicular to the coated surface portions bears a relation to the axis passing through the bare portions of about 1 to ½.

3. A welding wire as defined in claim 1 in which at least one of the bare surface portions has a bare projection thereon extending the entire length of the wire.

4. A welding wire as defined in claim 1 in which at least one of the bare surface portions is so shaped as to provide a more effective contacting and guiding portion thereon.

5. A welding wire having a flat bare surface and a coated surface, both surfaces extending lengthwise of the wire parallel to its axis, and said flat surface having a longitudinal projection thereon.

6. A welding wire having a bare surface and a coated surface, both surfaces extending lengthwise of the wire, and a ridge coextensive with and adjoining said bare surface.

7. A welding wire having two separate flat bare surfaces and two separate coated surfaces, said surfaces extending lengthwise of the wire parallel to its axis and each coated surface being disposed between said bare surfaces.

8. A welding wire as claimed in claim 7, including ridges severally coextensive with said bare surfaces.

9. A welding rod having flux coated surfaces and bare surfaces, all such surfaces extending lengthwise of the rod and each flux coated surface being disposed between bare surfaces, the distance between bare surfaces, measured perpendicular to the longitudinal axis of the rod, being substantially less than the distance between the coated surfaces, measured perpendicular to said axis.

10. A welding rod having flux coated surfaces and flat bare surfaces, all such surfaces extending lengthwise of the rod, and each flux coated surface being disposed between bare surfaces.

11. A welding rod having flux coated surfaces and flat bare surfaces, all such surfaces extending lengthwise of the rod, and each flux coated surface being curved transversely of the longitudinal axis of the rod and disposed between bare surfaces.

GEORGE T. SOUTHGATE.
JAMES G. NICOLSON.

CERTIFICATE OF CORRECTION.

Patent No. 2,102,813.                                            December 21, 1937.

GEORGE T. SOUTHGATE, ET AL.

It is hereby certified that the name of the assignee in the above numbered patent was erroneously described and specified as "Union Carbide and Carbon Company" whereas said name should have been described and specified as Union Carbide and Carbon Corporation, a corporation of New York, as shown by the record of assignments in this office; and that the said Letters Patent should be read with this correction therein that the same may conform to the record of the case in the Patent Office.

Signed and sealed this 15th day of February, A. D. 1938.

Henry Van Arsdale,
Acting Commissioner of Patents.

(Seal)